United States Patent
Mochida et al.

(10) Patent No.: US 11,470,369 B2
(45) Date of Patent: Oct. 11, 2022

(54) VIDEO/AUDIO TRANSMISSION SYSTEM, TRANSMISSION METHOD, TRANSMISSION DEVICE, AND RECEPTION DEVICE

(71) Applicant: Nippon Telegraph and Telephone Corporation, Tokyo (JP)

(72) Inventors: Yasuhiro Mochida, Musashino (JP); Takahiro Yamaguchi, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 17/259,250

(22) PCT Filed: Jul. 16, 2019

(86) PCT No.: PCT/JP2019/027927
§ 371 (c)(1),
(2) Date: Jan. 11, 2021

(87) PCT Pub. No.: WO2020/017499
PCT Pub. Date: Jan. 23, 2020

(65) Prior Publication Data
US 2021/0289243 A1    Sep. 16, 2021

(30) Foreign Application Priority Data
Jul. 19, 2018   (JP) ............................. JP2018-136224

(51) Int. Cl.
*H04N 7/173*   (2011.01)
*H04N 21/242*  (2011.01)
(Continued)

(52) U.S. Cl.
CPC ....... *H04N 21/242* (2013.01); *H04N 21/4305* (2013.01); *H04N 21/4307* (2013.01);
(Continued)

(58) Field of Classification Search
CPC ............. H04N 21/242; H04N 21/4305; H04N 21/4307; H04N 21/4392; H04N 21/8547; H04N 19/152; H04L 7/005
See application file for complete search history.

(56) References Cited

U.S. PATENT DOCUMENTS 10,573,274 B2 * 2/2020 Champel ................ H04N 21/47
2015/0281752 A1 * 10/2015 Van Veldhuisen ..........................
H04N 21/8456
725/116

(Continued)

FOREIGN PATENT DOCUMENTS

EP     2150062     2/2010
JP     H11-27668   1/1999
(Continued)

OTHER PUBLICATIONS

Mochida et al., "Development of an MMT Converter for MPEG-2 TS Audio/Video," Lecture Proceedings of the 2018 General Conference of IEICE: Communication 2, The Institute of Electronics, Information and Communication Engineers, Mar. 6, 2018, 4 pages (with English Translation).

*Primary Examiner* — Mulugeta Mengesha
(74) *Attorney, Agent, or Firm* — Fish & Richardson P.C.

(57) ABSTRACT

A video audio transmission system, transmission method, sending device, and reception device capable of avoiding buffer overflow and buffer depletion in a decoding device and realizing Group of Pictures (GOP) synchronization in encoding devices by eliminating clock deviation among devices. In the video audio transmission system, the sending devices supply clocks generated from common time point information to cameras as genlock signals. The reception devices supply clocks generated from the common time point information to the decoding devices as genlock signals. Therefore, clock deviation between the devices can be (Continued)

eliminated, and the buffer overflow and the buffer depletion in the decoding device can be avoided. Frame periods of video signals output by a plurality of dispersed cameras can be aligned, and reliable GOP synchronization can be realized by the encoding devices on a latter stage with respect to the cameras.

7 Claims, 7 Drawing Sheets

(51) Int. Cl.

| | | |
|---|---|---|
| H04N 21/43 | (2011.01) | |
| H04N 21/439 | (2011.01) | |
| H04N 21/8547 | (2011.01) | |
| H04N 19/152 | (2014.01) | |
| H04L 7/00 | (2006.01) | |

(52) U.S. Cl.
CPC ..... *H04N 21/4392* (2013.01); *H04N 21/8547* (2013.01); *H04L 7/005* (2013.01); *H04N 19/152* (2014.11)

(56) References Cited

U.S. PATENT DOCUMENTS

| | | | |
|---|---|---|---|
| 2016/0241888 A1* | 8/2016 | Lim | H04N 21/440218 |
| 2017/0180766 A1* | 6/2017 | Iguchi | H04L 65/80 |
| 2018/0262800 A1* | 9/2018 | Hirata | H04N 21/4305 |
| 2020/0336719 A1 | 10/2020 | Morisawa et al. | |

FOREIGN PATENT DOCUMENTS

| | | |
|---|---|---|
| JP | 2001-285789 | 10/2001 |
| JP | 2014-90270 | 5/2014 |
| JP | 2017-211827 | 11/2017 |
| WO | WO 2017/029402 | 2/2017 |

* cited by examiner

VIDEO/AUDIO TRANSMISSION SYSTEM, TRANSMISSION METHOD, TRANSMISSION DEVICE, AND RECEPTION DEVICE

CROSS-REFERENCE TO RELATED APPLICATIONS

This application is a National Stage application under 35 U.S.C. § 371 of International Application No. PCT/JP2019/027927, having an International Filing Date of Jul. 16, 2019, which claims priority to Japanese Application Serial No. 2018-136224, filed on Jul. 19, 2018. The disclosure of the prior application is considered part of the disclosure of this application, and is incorporated in its entirety into this application.

TECHNICAL FIELD

The present disclosure relates to a transmission device that transmits an encoded video/audio stream and includes a sending device and a reception device. In particular, the present disclosure relates to a transmission device that converts MPEG-2 TS to MMT and transmits the MMT, a transmission device that performs Group Of Pictures (GOP) synchronization of dispersed encoding devices, and a transmission device that switches an output video/audio stream without stopping a decoding device.

The present disclosure relates to a transmission method for transmitting an encoded video/audio stream and including a sending method and a receiving method. In particular, the present disclosure relates to a transmission method for converting MPEG-2 TS to MMT and transmitting the MMT, a transmission method for performing GOP synchronization of dispersed encoding devices, and a transmission method for switching an output video/audio stream without stopping a decoding device.

BACKGROUND ART

As a container format technology in which an encoded stream of a video/audio is transmitted by a transmission path with an error, an MPEG-2 Transport Stream (TS) format (ISO/IEC 13818-1) is widely used. In MPEG-2 TS, a data unit called Packetized Elementary Stream (PES) in which media data of the video/audio is stored is divided into TS packets (mainly 188 bytes) and is transmitted. A sending-out time stamp called Program Clock Reference (PCR) is given to the TS packet. The PCR is a time stamp that counts up in accordance with a 27-MHz clock called System Time Clock (STC) of an encoding device. The higher-order 33 bits of the PCR express a value of 90 kHz, and the lower-order 9 bits express a value of 27 MHz by 0 to 299. The initial value of the PCR is freely-selected and generally cannot be associated with absolute time such as the coordinated universal time (UTC), but functions as relative time between the encoding device and a decoding device. In order to control a display timing, the higher-order 33 bits of the PCR that is ahead of the time point by a certain amount of time are given to the PES as a display time stamp (PTS). In the decoding device, the timing of display is controlled by comparing the PCR and the PTS to each other. The TS packets can also be transmitted with use of an Internet Protocol (IP). However, there is a problem in that the overhead in the IP packetization is large because the TS packet length is fixed at a small size. In MPEG-2 TS, there has been a restriction in that the TS packets cannot be transmitted by combining different IP data flows (a combination of a sending source IP address, a sending source port number, a destination IP address, a destination port number, and a protocol type).

Thus, in MPEG Media Transport (MMT) (ISO/IEC 23008-1) standardized as a successor to MPEG-2 TS, a variable-length packet is employed, and efficient IP transmission is possible. The video/audio sent by a plurality of IP data flows can also be combined at the reception side.

CITATION LIST

Patent Literature

Patent Literature 1: Japanese Patent Laid-Open No. 2014-90270

SUMMARY OF THE INVENTION

Technical Problem

There is an advantage to MMT in that the affinity with the IP transmission is high as compared with MPEG-2 TS and advanced control is possible. However, preexisting encoding devices and decoding devices generally input and output the encoded stream by MPEG-2 TS. Thus, a sending device that accepts an MPEG-2 TS input and sends out the input in MMT and a reception device that receives MMT and outputs MPEG-2 TS are conceived. In MMT, the encoded stream is transmitted by being stored in a data unit called Media Processing Unit (MPU) in units of GOPs. In order to control the display timing of the MPU, a display time stamp (mpu_presentation_time) is designated by a control message. As with the length format time stamp used in a Network Time Protocol (NTP RFC5905), mpu_presentation_time is described with a total of 64 bits, that is, 32 bits of the integer part and 32 bits of the decimal part as an UTC time point of which starting point is 0 hours, 0 minutes, 0 seconds, Jan. 1, 1900. In order to perform interconversion of MPEG-2 TS and MMT, the PCR and the UTC used in the timing control need to be interconverted. Given that the clock frequency of the STC is exactly 27 MHz, the interconversion is possible by causing a set of the PCR and the UTC at a certain time point to be a starting point. However, in reality, the existence of an error is inevitable, and hence there is a fear that the proceeding speeds of the PCR and the UTC may not be synchronized and buffer overflow and buffer depletion of the decoding device may occur when the operation is performed for a long period of time. Thus, a first problem to be solved by the present invention is to realize interconversion in which the proceeding speeds are synchronized between the PCR and the UTC and to avoid the buffer overflow and the buffer depletion of the decoding device.

Now, a case where videos simultaneously filmed by a plurality of cameras that are lined up are encoded by H.265 and the like by a plurality of encoding devices, and MPEG-2 TS output from each of the encoding devices is converted to MMT by a plurality of sending devices and is sent is conceived. A case where, on the reception side, each of a plurality of reception devices receives MMT, converts MMT to MPEG-2 TS, and outputs MPEG-2 TS, decoding is performed by a plurality of decoding devices, and the decoded videos are displayed on a plurality of display devices in an arranged manner or displayed as one video by being combined with each other is conceived. At this time, when mpu_presentation_time given to frames that are simultaneously filmed in each system is aligned, the plurality of camera videos can be displayed in synchronization with each other. However, when the GOP phases of the encoding of the videos are shifted from each other, different pictures may be arranged when those videos are combined. Therefore, there is a fear that the viewing quality may be deteriorated due to the non-uniformity of the image quality. The GOP is a set of successive frames serving as a unit of video encoding processing and is formed by three types of pictures (an I picture, a P picture, and a B picture), but there is generally a difference in the image quality of the pictures. Therefore, the phases of the GOPs are required to be aligned when videos are combined. The alignment of the GOP phases in a plurality of encoding devices is referred to as GOP synchronization.

A structure indicating how many frames are included in one GOP and what kind of order the three types of pictures are arranged is referred to as a GOP structure. As a precondition for performing the GOP synchronization, all of the encoding devices to be synchronized use a common GOP structure and the frame periods are aligned. Patent Literature 1 discloses an encoding device with which a plurality of dispersed devices can perform GOP synchronization. According to Patent Literature 1, a plurality of dispersed encoding devices can autonomously perform GOP synchronization with each other by calculating a GOP starting time point with use of time point information acquired from a Global Positioning System (GPS) signal and the like. However, in Patent Literature 1, the deviation of the frame periods due to the clock deviation between the devices is not taken into consideration, and hence there is a problem in that the GOP phases are shifted from each other as the operation is continued even when the GOP synchronization is performed at the start of encoding. There is also a problem in that it is difficult to perform GOP synchronization with a device that has started encoding from a different GOP starting time point. Thus, a second problem to be solved by the present invention is the realization of the GOP synchronization.

In other words, the present invention is a video audio transmission system, a transmission method, a sending device, and a reception device for converting MPEG-2 TS to MMT and transmitting the MMT, and an object thereof is to avoid buffer overflow and buffer depletion in a decoding device and to realize GOP synchronization in encoding devices by eliminating clock deviation between devices in order to solve the abovementioned problem.

Means for Solving the Problem

In order to achieve the abovementioned object, a video audio transmission system according to the present invention generates a genlock signal with use of absolute time.

Specifically, the video audio transmission system according to the present invention is a video audio transmission system, including: a plurality of sending devices that each encode a video audio signal from a subordinate camera by a subordinate one of encoding devices and send the video audio signal by a packet of a freely-selected transmission protocol; and a plurality of reception devices that each decode the packet, which is sent from each of the sending devices, to the video audio signal by decoding the packet by a subordinate decoding device, the video audio transmission system performing GOP, that is, Group Of Pictures synchronization of the encoding devices. In the video audio transmission system, the sending devices each include a sending-side clock signal generation unit, a sending-side genlock signal generation unit, a start control unit, and a sending control unit, the sending-side clock signal generation unit acquires absolute time and generates a clock for video synchronized with the absolute time, the sending-side genlock signal generation unit generates a frame border time point from the absolute time by a first method common between the sending devices and supplies a genlock signal generated from the clock for video and the frame border time point to the subordinate camera, the start control unit calculates a GOP border time point from the absolute time by a second method common between the sending devices and controls a timing at which a start signal that is an instruction for starting encoding of the video audio signal from the camera is sent to the encoding device by the GOP border time point, the sending control unit replaces a time stamp included in an encoded stream generated by the encoding device with a time stamp in accordance with the absolute time and sends the time stamp as the packet of the transmission protocol, the reception devices each include a reception-side clock signal generation unit, a reception-side genlock signal generation unit, and a reception control unit, the reception-side clock signal generation unit acquires absolute time and generates a clock for video synchronized with the absolute time, the reception-side genlock signal generation unit generates a frame border time point from the absolute time by a first method common between the reception devices, and supplies a genlock signal generated from the clock for video and the frame border time point to the subordinate decoding device, and the reception control unit generates relative time from the absolute time by a third method common between the reception devices, extracts the encoded stream from the received packet of the transmission protocol, and replaces the time stamp in accordance with the absolute time included in the encoded stream with a time stamp in accordance with the relative time.

A transmission method according to the present invention is a transmission method of a video audio transmission system, the video audio transmission system including: a plurality of sending devices that each encode a video audio signal from a subordinate camera by a subordinate one of encoding devices and send the video audio signal by a packet of a freely-selected transmission protocol; a plurality of reception devices that each decode the packet, which is sent from each of the sending devices, to the video audio signal by decoding the packet by a subordinate decoding device; and a plurality of display devices that combines the video audio signals decoded by the reception devices and displays the video audio signals as one image, the transmission method including: performing, by each of the sending devices, a sending-side clock signal generation procedure, a sending-side genlock signal generation procedure, a start control procedure, and a sending control procedure; acquiring absolute time and generating a clock for video synchronized with the absolute time in the sending-side clock signal generation procedure; generating a frame border time point from the absolute time by a first method common between the sending devices and supplying a genlock signal generated from the clock for video and the frame border time point to the subordinate camera in the sending-side genlock signal generation procedure; calculating a GOP border time point from the absolute time by a second method common between the sending devices and controlling a timing at which a start signal that is an instruction for starting encoding of the video audio signal from the camera is sent to the encoding device by the GOP border time point in the start control procedure; replacing a time stamp included in an encoded stream generated by the encoding device with a time stamp in accordance with the absolute time and sending the time stamp as the packet of the transmission protocol in the sending control procedure; performing, by each of the reception devices, a reception-side clock signal generation procedure, a reception-side genlock signal generation procedure, and a reception control procedure; acquiring absolute time and generating a clock for video synchronized with the absolute time in the reception-side clock signal generation procedure; generating a frame border time point from the absolute time by a first method common between the reception devices and supplying a genlock signal generated from the clock for video and the frame border time point to the subordinate decoding device in the reception-side genlock signal generation procedure; generating relative time from the absolute time by a third method common between the reception devices, extracting the encoded stream from the received packet of the transmission protocol, and replacing the time stamp in accordance with the absolute time included in the encoded stream with a time stamp in accordance with the relative time in the reception control procedure; and performing GOP synchronization of the encoding devices and performing synchronization of the relative time generated by the reception devices.

A sending device according to the present invention is a sending device that encodes a video audio signal from a subordinate camera by a subordinate encoding device and sends the video audio signal by a packet of a freely-selected transmission protocol, the sending device including a sending-side clock signal generation unit, a sending-side genlock signal generation unit, and a sending control unit. In the sending device, the sending-side clock signal generation unit acquires absolute time and generates a clock for video synchronized with the absolute time, the sending-side genlock signal generation unit supplies a genlock signal generated from the clock for video to the subordinate camera, the sending control unit replaces a time stamp included in an encoded stream generated by the encoding device with a time stamp in accordance with the absolute time and sends the time stamp as the packet of the transmission protocol, and conversion of time stamps of which proceeding speeds are synchronized is performed between the time stamp included in the encoded stream and the time stamp in accordance with the absolute time.

The sending-side genlock signal generation unit of the sending device according to the present invention calculates a frame border time point from the absolute time by a first method common between a plurality of the sending devices and controls the genlock signal by the frame border time point, the sending device further includes a start control unit that calculates a GOP border time point from the absolute time by a second method common between the sending devices and controls a timing at which a start signal that is an instruction for starting encoding of the video audio signal from the camera is sent to the encoding device by the GOP border time point, and GOP synchronization of the subordinate encoding device and an encoding device subordinate to another one of the sending devices is performed.

A reception device according to the present invention is a reception device that decodes a packet of a freely-selected transmission protocol, which is obtained by encoding a video audio signal from a camera by an encoding device and replacing a time stamp included in an encoded stream generated by the encoding device with a time stamp in accordance with absolute time and which is sent by a sending device, to the video audio signal by decoding the packet by a subordinate decoding device, the reception device including a reception-side clock signal generation unit, a reception-side genlock signal generation unit, and a reception control unit. In the reception device, the reception-side clock signal generation unit acquires absolute time and generates a clock for video synchronized with the absolute time, the reception-side genlock signal generation unit generates a frame border time point from the absolute time by a first method common between a plurality of the reception devices, and supplies a genlock signal generated from the clock for video and the frame border time point to the subordinate decoding device, the reception control unit generates relative time from the absolute time by a third method common between the reception devices, extracts the encoded stream from the received packet of the transmission protocol, and replaces the time stamp in accordance with the absolute time included in the encoded stream with a time stamp in accordance with the relative time, and the relative time is synchronized with relative time generated by another one of the reception devices.

All of the sending devices supply the clocks generated from the common time point information by the common method to the cameras as genlock signals. Therefore, the cameras output video signals synchronized with other cameras. The clock frequency of the STC in the encoding device follows the clock of the input video signal, and hence the proceeding speeds of the PCRs of all of the encoding devices are synchronized with the common time point information. All of the reception devices supply the clocks generated from the common time point information by the common method to the decoding devices as the genlock signals. Therefore, the proceeding speeds of the PCRs of all of the decoding devices are synchronized with the common time point information, and hence the clock deviation between the devices are eliminated and accurate interconversion between the PCR and the UTC becomes possible. In other words, by accurate interconversion between the PCR and the UTC, the buffer overflow and the buffer depletion in the decoding device can be avoided.

The frame periods of the video signals output by the plurality of dispersed cameras can be aligned and the periods of the encoding processing in the encoding devices on the latter stages are also aligned, and hence the synchronization of the GOP can be maintained.

Therefore, the present invention can provide the video audio transmission system, the transmission method, the sending device, and the reception device capable of avoiding the buffer overflow and the buffer depletion in the decoding device and realizing the GOP synchronization in the encoding devices by eliminating the clock deviation between the devices.

The reception control unit of the video audio transmission system according to the present invention includes a plurality of buffers that each hold the packet of the transmission protocol received from each of a plurality of the sending devices, and the encoded stream is extracted from the packet of the transmission protocol of a selected one of the buffers. The reception device includes a plurality of buffers, and hence a plurality of videos may be switched without interruption.

Effects of the Invention

The present invention can provide the video audio transmission system, the transmission method, the sending device, and the reception device capable of avoiding the buffer overflow and the buffer depletion in the decoding device and realizing the GOP synchronization in the encoding devices by eliminating the clock deviation between the devices.

DESCRIPTION OF EMBODIMENTS

Embodiments of the present invention are described with reference to the accompanying drawings. The embodiments described below are examples of the present invention, and the present invention is not limited to the embodiments below. Components of which reference characters are the same in the present description and the drawings are considered to be the same components.

Conditions of Embodiments

Preconditions of the present embodiments are described.

An encoded stream supplied to a sending device by an encoding device includes relative time that proceeds in accordance with a clock of a video signal. The relative time means relative time that functions as a time point only between the encoding device and a decoding device. The video/audio that is the payload of the encoded stream includes a display time stamp expressed by the relative time.

For example, the encoded stream is in a MPEG-2 TS format. Here, PCR corresponds to the relative time, and PTS corresponds to the display time stamp.

A camera outputs a video/audio signal synchronized with a supplied genlock signal.

The encoding device operates in synchronization with a clock of an input signal.

The encoding devices that are operated in synchronization with each other are set so as to have the same delay time from the input of the video signal to the display and the same GOP structure.

The transmission protocol is not limited but converts a display time stamp in relative time included in the encoded stream to a display time stamp in absolute time and transmits the display time stamp. For example, the transmission protocol is MMT. The transmission protocol may be an original protocol obtained by adding an equivalent function to a Real-time Transport Protocol (RTP) and the like.

The decoding device receives the encoded stream including a relative time value and decodes/outputs the video/audio in accordance with the display time stamp.

Embodiment 1

Embodiment 1 is a sending device that converts the encoded stream of the video/audio from MPEG-2 TS to an MMT protocol and transmits the encoded stream by an IP network, and a decoding device that converts the encoded stream of the video/audio received in the MMT protocol to MPEG-2 TS.

Figure 1:
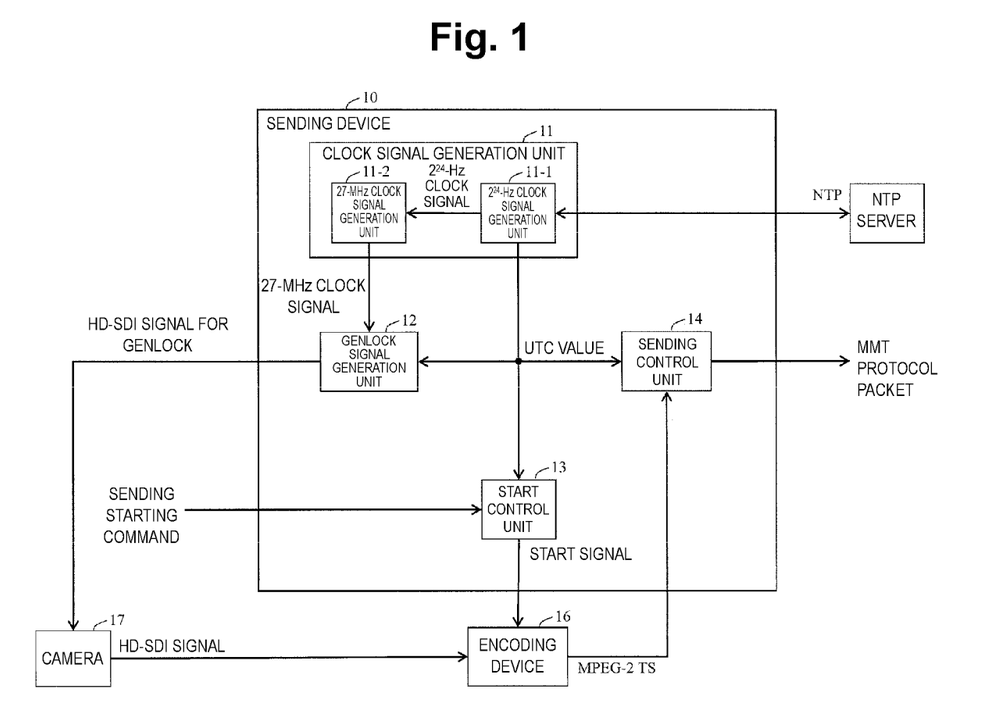
FIG. 1 illustrates a sending device according to the present invention.

FIG. 1 illustrates the configuration of a sending device 10 of this embodiment. The sending device 10 is a sending device that encodes a video audio signal from a subordinate camera 17 by a subordinate encoding device 16 and sends a packet of a freely-selected transmission protocol, the sending device 10 including a sending-side clock signal generation unit 11, a sending-side genlock signal generation unit 12, a start control unit 13, and a sending control unit 14. In the sending device 10, the sending-side clock signal generation unit 11 acquires absolute time and generates a clock for video synchronized with the absolute time, the sending-side genlock signal generation unit 12 generates a frame border time point from the absolute time by a first method common between a plurality of the sending devices and supplies a genlock signal generated from the clock for video and the frame border time point to the subordinate camera 17, the start control unit 13 calculates a GOP border time point from the absolute time by a second method common between the sending devices and controls a timing at which a start signal that is an instruction for starting encoding of the video audio signal from the camera 17 is sent to the encoding device 16 by the GOP border time point, the sending control unit 14 replaces a time stamp included in an encoded stream generated by the encoding device 16 with a time stamp in accordance with the absolute time and sends the time stamp as the packet of the transmission protocol, and conversion of time stamps of which proceeding speeds are synchronized is performed between the time stamp included in the encoded stream and the time stamp in accordance with the absolute time.

In this embodiment, the output video of the camera 17 uses a High-Definition Serial Digital Interface (HD-SDI) signal, the HD-SDI signal is also used for the genlock signal, and the audio is also embedded in the HD-SDI signal. As the video encoding system, H.265 is used. For the audio encoding, MPEG-4 Advanced Audio Coding (AAC) is used. As the encoded stream format, MPEG-2 TS is used. For the frequency of the clock signal for video, 27 MHz is used.

In this embodiment, special functions are not necessarily needed for the camera 17, the encoding device 16, and a decoding device 26, and hence preexisting cameras, encoding devices, and decoding devices can be effectively used.

The clock signal generation unit 11 holds absolute time such as the UTC and generates a clock signal for video in synchronization with the absolute time. An NTP, a Precision Time Protocol (PTP), or a GPS signal may be used for the acquisition of the absolute time. The accuracy may be improved by combining those absolute time value acquisition methods and a pulse signal such as a 1 Pulse Per Second (PPS) supplied from the outside.

In this embodiment, the UTC is acquired with use of the NTP. The oscillation frequency of a Voltage Controlled Crystal Oscillator (VCXO) that is a $2^{24}$-Hz clock signal source is controlled such that the proceeding speed of a $2^{24}$-Hz clock signal generation unit 11-1 matches with that of the UTC. The UTC is expressed by an NTP length format time stamp (32 bits for an integer part and 32 bits for a decimal part). The series $\{s_1, s_2, \ldots\}$ of the UTC acquired by the NTP is conceived to include an error, and hence PID control is used. When a predictive value for $s_k$ (k is a natural number) is represented by $t_k$, the control deviation is expressed by $e_k = s_k - t_k$. By causing the clock frequency to be $2^{24}$ Hz, the predictive value can be generated simply by incrementing the digit of $2^{-24}$ of a counter each time the clock rises. When a voltage applied to the VCXO is represented by Vk, a proportional gain is represented by $K_P$, an integral gain is represented by $K_I$, and a derivative gain is represented by $K_D$, the PID control is expressed as follows.

[Formula 1]

$$V_k = K_P e_k + \Sigma_n e_n + K_D(e_k - e_{k-1}) \quad (1)$$

Figure 3:
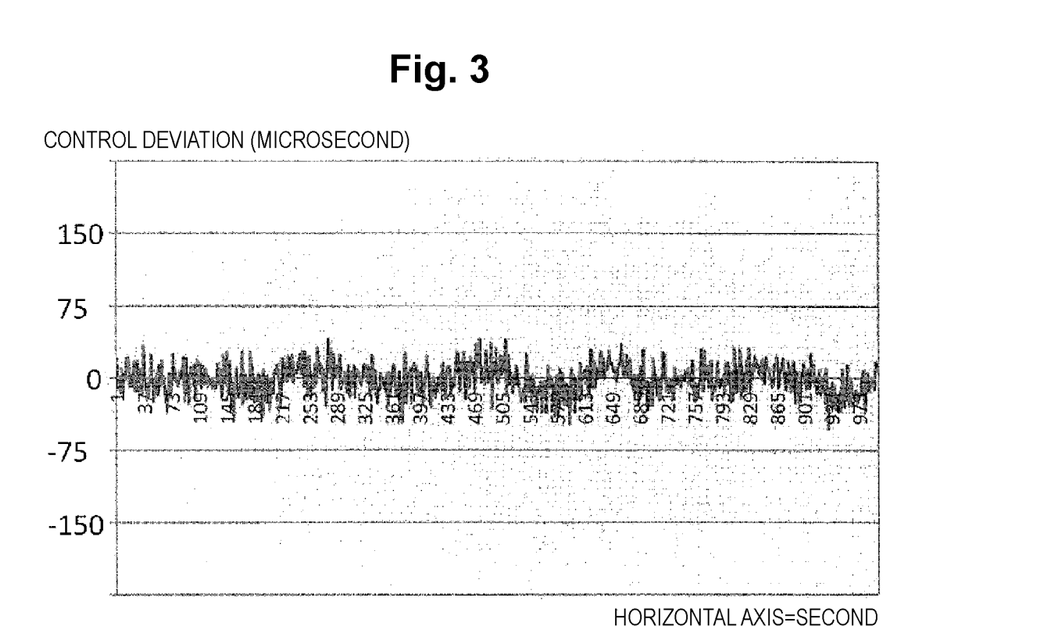
FIG. 3 illustrates a performance of a clock signal generation unit of the sending device according to the present invention following the coordinated universal time (UTC).

FIG. 3 shows an example of a result obtained when control for following the UTC is performed. As experimental conditions, a delay jitter in accordance with a normal distribution with a standard deviation of 1 ms and a central value of 10 ms is added, but the control deviation is suppressed at 100 microseconds or less. The synchronization accuracy may be improved with use of pulse signals of 1 pps, 10 Mpps, and the like.

A 27-MHz clock signal generation unit 11-2 divides/multiplies the $2^{24}$ Hz clock signal obtained as above by a Phase Lock Loop (PLL) and generates 27 MHz that is a clock signal for video.

The genlock signal generation unit 12 generates an HD-SDI signal for genlock signal from the clock signal for video and performs synchronization of the camera 17. The signal used as the genlock signal include a Black Burst signal and a ternary synchronizing signal besides the HD-SDI signal. A frame border time point is calculated from the absolute time by a common first method and genlock signals in the same phase are generated in a plurality of dispersed sending devices. As the common first method, in this embodiment, the time axis is divided by a frame period T with a starting point of 0 hours, 0 minutes, 0 seconds, Jan. 1, 1900 in accordance with the NTP length format time stamp, and the i-th (i is an integer equal to or more than 0) frame starting time point is represented by iT. The operation of the encoding devices 16 follows the input video signals. Therefore, when the video/audio signal output from the camera 17 is controlled by the genlock signal, the encoding device 17 on the latter stage operates in the same frame period, and hence follows the genlock signal. Therefore, the deviation of the frame period among the dispersed encoding devices 16 can be eliminated.

Figure 4:
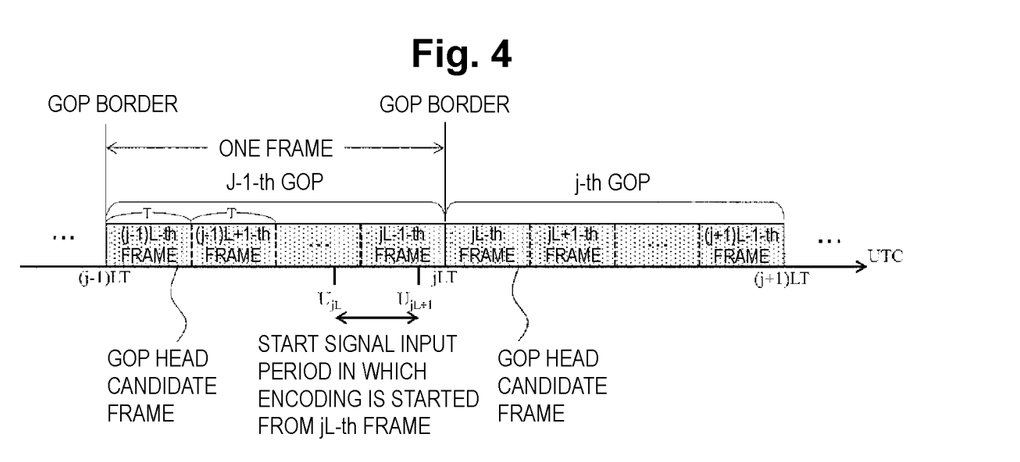
FIG. 4 illustrates timings of frames and start signal input in the sending device according to the present invention.

The start control unit 13 controls the timing at which the start signal is sent to the encoding device 16. In the start control units 13 of all of the sending devices, a GOP border time point is calculated from the absolute time by a common second method and the timing at which the start signal is sent is controlled such that the encoding starts from the GOP border time point. As the common second method, in this embodiment, as with the frame border, when the time axis is divided by a GOP period and the GOP length is L frames with a starting point of 0 hours, 0 minutes, 0 seconds, Jan. 1, 1900, the frame number of the head frame (referred to as a GOP head candidate frame) of the j-th (j is an integer equal to or more than 0) GOP is jL and the GOP starting time point is jLT (FIG. 4).

Figure 5:
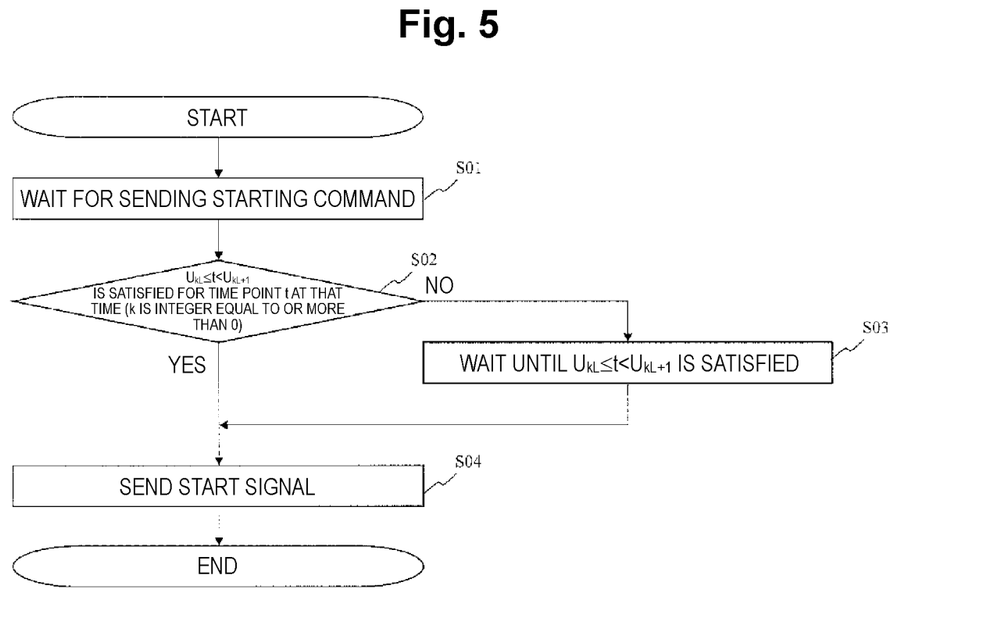
FIG. 5 illustrates the operation of the sending device according to the present invention.

The encoding devices 16 start the encoding from a freely-selected GOP head candidate frame. As a result, the GOP synchronization is realized. The start of the encoding is limited to the GOP head candidate frame, and hence the start signal control unit 13 controls a timing at which the start signal for starting the encoding is sent as illustrated in FIG. 5. When a sending starting command is input from the outside (Step S01), the start signal control unit 13 determines whether $U_{kL} \leq t < U_{kL+1}$ is satisfied for a time point t (UTC) at that time where k represents a freely-selected integer that is equal to or more than 0 (Step S02). When the time point t is not included in the abovementioned period ("No" in Step S02), temporary waiting is performed until the time point t is included in the period (Step S03). When the time point t is included in the period ("Yes" in Step S02), the start signal is sent to the encoding device 16 (Step S04). Note that $U_i$ is a starting point of a period in which the encoding starts from the i-th frame when the start signal is input to the encoding device 16.

In the sending control unit 14, a video/audio PES is extracted from MPEG-2 TS, and the MPU is formed by units of GOPs and is sent out to the IP network. In order to control a presentation time point of the MPU, the PTS on the head of the GOP is converted to mpu_presentation_time and the mpu_presentation_time is transmitted by a control message. The PTS ($t_{PTS}$) based on the PCR is converted to mpu_presentation_time ($t_{mpu}$) based on the UTC by Formula 2.

[Formula 2]

$$t_{mpu} = T_{UTC} + (t_{PTS} - T_{PCR})/f_{STC} \quad (2)$$

where $T_{UTC}$ and $T_{PCR}$ represent a set of the UTC and the PCR saved at a freely-selected timing.

Here, $t_{mpu}$ and $T_{UTC}$ represent seconds elapsed from 0 hours, 0 minutes, 0 seconds, Jan. 1, 1900. In addition, $f_{STC} = 2.7 \times 10^7$ is satisfied, and $t_{PTS}$ and $T_{PCR}$ represent values obtained by conversion into number of counts at 27 MHz. In other words, the PTS is a 90-kHz counter with 33 bits, and hence a value obtained by multiplication by 300 is used as $t_{PTS}$. The PCR is a 90-kHz counter for the higher-order 33 bits and a 27-MHz counter from 0 to 299 for the lower-order 9 bits, and hence a value obtained by multiplying the number of the higher-order 33 bits by 300 and adding the lower-order 9 bits thereto is used as $T_{PCR}$. An offset may be inserted as necessary.

Figure 2:
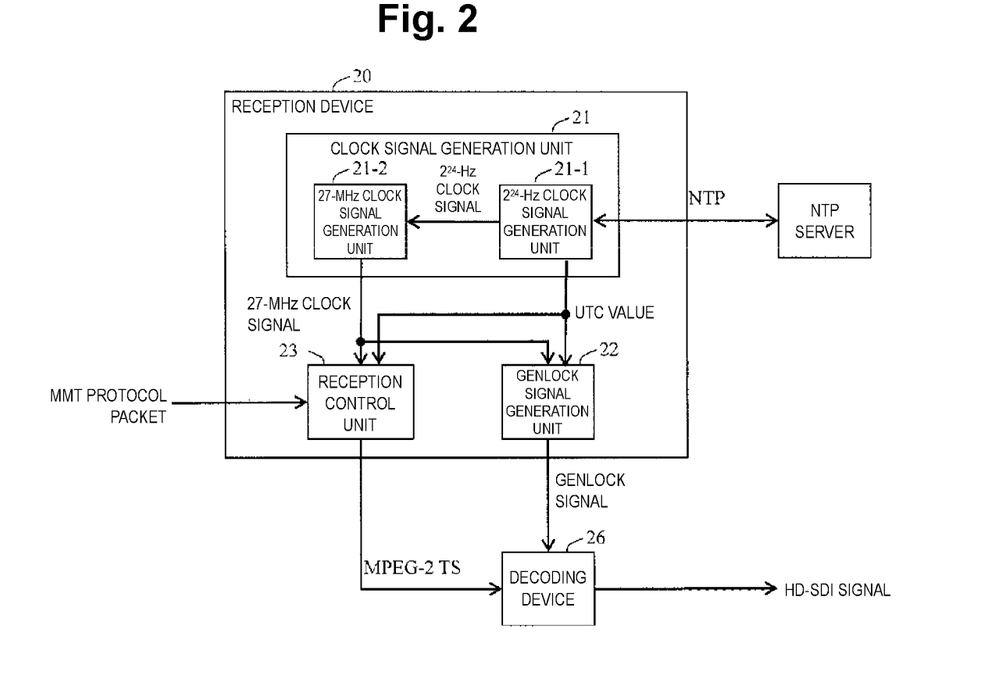
FIG. 2 illustrates a reception device according to the present invention.

FIG. 2 illustrates the configuration of a reception device 20 of this embodiment. The reception device 20 is a reception device that decodes a packet of a freely-selected transmission protocol, which is obtained by encoding a video audio signal from the camera 17 by the encoding device 16 and replacing a time stamp included in an encoded stream generated by the encoding device 16 with a time stamp in accordance with absolute time and which is sent by the sending device 10, to the video audio signal by decoding the packet by the subordinate decoding device 26, the reception device 20 including a reception-side clock signal generation unit 21, a reception-side genlock signal generation unit 22, and a reception control unit 23. In the reception device 20, the reception-side clock signal generation unit 21 acquires absolute time and generates a clock for video synchronized with the absolute time, the reception-side genlock signal generation unit 22 supplies a genlock signal generated from the absolute time to the subordinate decoding device 26, the reception control unit 23 generates relative time from the absolute time by a third method common between a plurality of the reception devices, extracts the encoded stream from the received packet of the transmission protocol, and replaces the time stamp in accordance with the absolute time included in the encoded stream with a time stamp in accordance with the relative time, and the relative time is synchronized with relative time generated by another one of the reception devices.

The functions of the clock signal generation unit 21 and the genlock signal generation unit 22 are similar to the functions of the clock signal generation unit 11 and the genlock signal generation unit 12 of the sending device. The reception device 20 can synchronize the frame phase of the decoding device 26 with other decoding devices by the generated genlock signal.

The reception control unit 23 extracts the video/audio from the received MMT protocol packet, reconfigures the video/audio PES, and outputs MPEG-2 TS. The reception control unit 23 holds the PCR that proceeds in accordance with the supplied 27-MHz clock signal and uses the PCR for the stamping of the PCR and the PTS onto MPEG-2 TS, but the initial value of the PCR has an arbitrariness. By deriving the STC from the UTC by a common third method by all of the reception devices, the arbitrariness of the initial value is eliminated, and autonomous synchronization of the PCRs in the plurality of dispersed reception devices becomes possible. As the common third method, in this embodiment, the STC ($t_{PCR}$) is calculated from the UTC ($t_{UTC}$) with the starting point of the PCR being 0 hours, 0 minutes, 0 seconds, Jan. 1, 1900. The conversion of the UTC value to the STC is expressed as follows.

[Formula 3]

$$t_{PCR} = t_{UTC} \times f_{STC} \qquad (3)$$

Formula 3 is also used for the conversion of mpu_presentation_time to the PTS.

The reception control unit 23 includes a plurality of buffers that each hold the packet of the transmission protocol, which is received from each of the plurality of sending devices 10 and of which GOP synchronization is performed by the decoding device 26, and the encoded stream is extracted from the packet of the transmission protocol of the selected one of the buffers.

The reception control unit 23 may include a plurality of buffers in order to simultaneously receive the MMT protocol packets including the video/audio from the plurality of sending devices 10 and to enable the switching of the video/audio output as MPEG-2 TS. In the reception control unit 23, the PCR derived from the UTC in the reception device 20 is given regardless of the PCR given by the encoding device 16, and hence the PCR does not discontinuously change before and after the video/audio switching. Therefore, the operation can be continued without resetting the decoding device 26.

Embodiment 2

Figure 6:
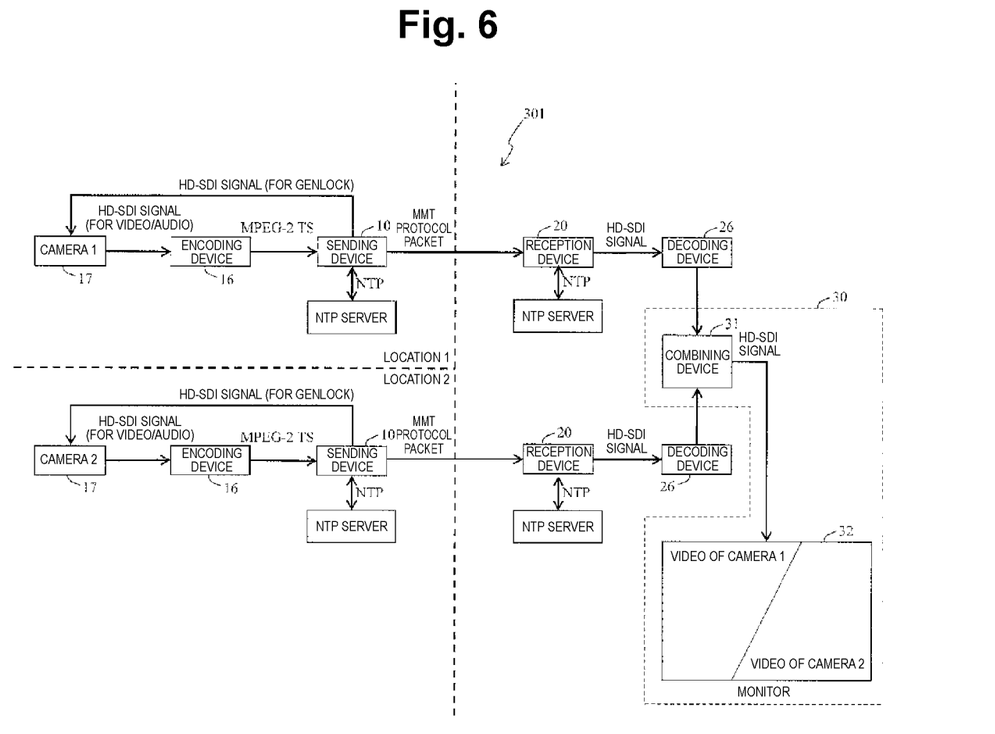
FIG. 6 illustrates a video audio transmission system according to the present invention.

Embodiment 2 is a video audio transmission system 301 that transmits videos filmed in different places by an IP network with use of an MMT protocol and combines and displays the videos. FIG. 6 is an entire configuration example of the system.

The video audio transmission system 301 of this embodiment is a video audio transmission system including: a plurality of the sending devices 10 that each encode a video audio signal from the subordinate camera 17 by the subordinate encoding device 16 and send the video audio signal by a packet of a freely-selected transmission protocol; a plurality of the reception devices 20 that each decode the packet, which is sent from each of the sending devices 10, to the video audio signal by decoding the packet by the subordinate decoding device 26; and a display device 30 that combines the video audio signals decoded by the reception devices 20 and displays the video audio signals as one image, the video audio transmission system 301 performing GOP synchronization of the encoding devices 16. In the video audio transmission system 301, the sending devices 10 each include the sending-side clock signal generation unit 11, the sending-side genlock signal generation unit 12, the start control unit 13, and the sending control unit 14, the sending-side clock signal generation unit 11 acquires absolute time and generates a clock for video synchronized with the absolute time, the sending-side genlock signal generation unit 12 generates a frame border time point from the absolute time by a first method common between the sending devices and supplies a genlock signal generated from the clock for video and the frame border time point to the subordinate camera 17, the start control unit 13 calculates a GOP border time point from the absolute time by a second method common between the sending devices 10 and controls a timing at which a start signal that is an instruction for starting encoding of the video audio signal from the camera 17 is sent to the encoding device 16 by the GOP border time point, the sending control unit 14 replaces a time stamp included in an encoded stream generated by the encoding device 16 with a time stamp in accordance with the absolute time and sends the time stamp as the packet of the transmission protocol, the reception devices 20 each include the reception-side clock signal generation unit 21, the reception-side genlock signal generation unit 22, and the reception control unit 23, the reception-side clock signal generation unit 21 acquires absolute time and generates a clock for video synchronized with the absolute time, the reception-side genlock signal generation unit 22 generates a frame border time point from the absolute time by a first method common with other reception devices and supplies a genlock signal generated from the clock for video and the frame border time point to the subordinate decoding device 26, and the reception control unit 23 generates relative time from the absolute time by a third method common between the reception devices 20, extracts the encoded stream from the received packet of the transmission protocol, and replaces the time stamp in accordance with the absolute time included in the encoded stream with a time stamp in accordance with the relative time.

The video audio transmission system 301 combines (obtains one video by vertically or horizontally arranging two videos) HD-SDI signals output from two of the reception devices 20 by a combining device 31, and outputs the HD-SDI signals as one HD-SDI signal. By performing GOP synchronization of two videos to be combined, the image quality of the combined video displayed on a monitor 32 can be kept uniform.

Embodiment 3

Figure 7:
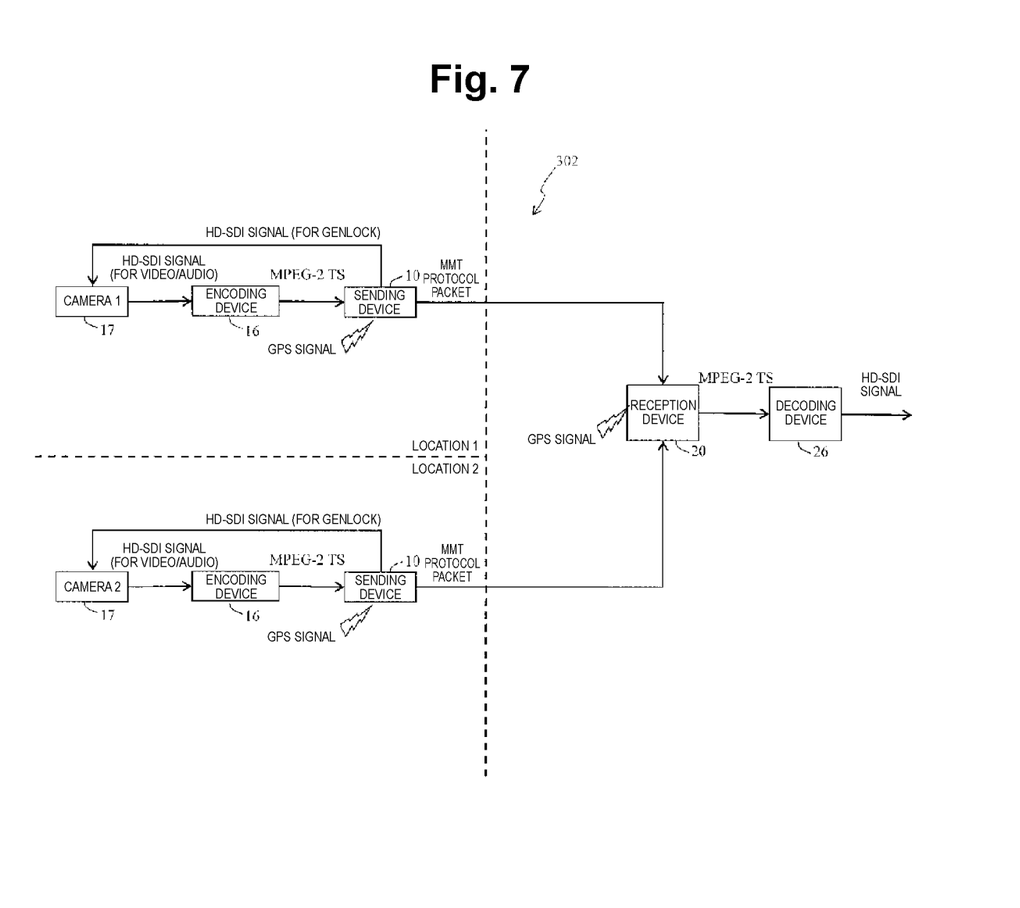
FIG. 7 illustrates a video audio transmission system according to the present invention.

FIG. 7 illustrates a video audio transmission system 302 of Embodiment 3. The video audio transmission system 302 is different from the video audio transmission system 301 in Embodiment 2 in that MMT protocol packets from the plurality of sending devices 10 are received by a single reception device 20 having a plurality of buffers and the video/audio output in MPEG-2 TS is switched and output to the decoding device 26 in the video audio transmission system 302. In other words, the reception control unit 23 has a plurality of buffers that each hold packet of the transmission protocols received from each of the plurality of sending devices 10 and the encoded stream is extracted from the packet of the transmission protocol of a selected one of the buffers.

In this embodiment, one MPU is formed by one GOP. In the buffers of the reception device 20, the MPU is reconfigured from the received MMT protocol packet and is accumulated. The display time point can be associated with each MPU from mpu_presentation_time included in the control message.

Figure 8:
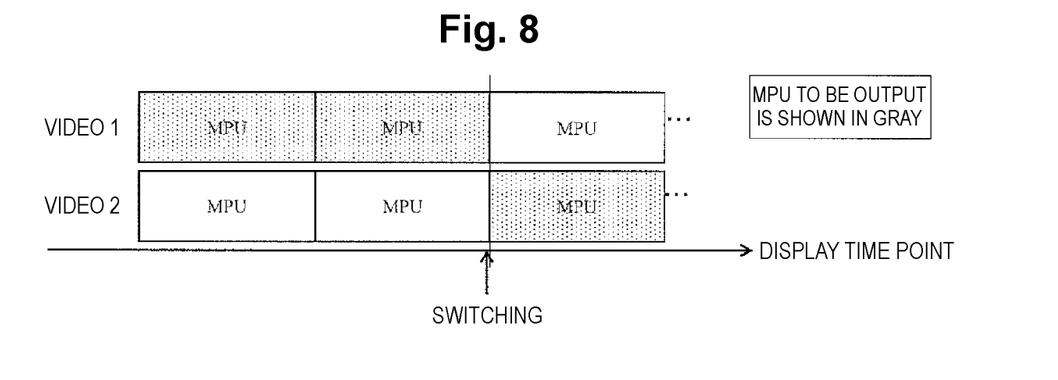
FIG. 8 illustrates the operation when videos are switched in the video audio transmission system according to the present invention.

FIG. 8 illustrates the operation of switching a video 1 to a video 2 performed by the reception device 20. The GOP border time points are aligned between the video 1 and the video 2, and hence the display time points change in a continuous manner and at even intervals even before and after the video switching. Because the PCR of the MPEG-2 TS that is sent out changes in a continuous manner before and after the switching, video switching without interruption is possible without resetting the decoding device 26.

Embodiment 4

Figure 9:
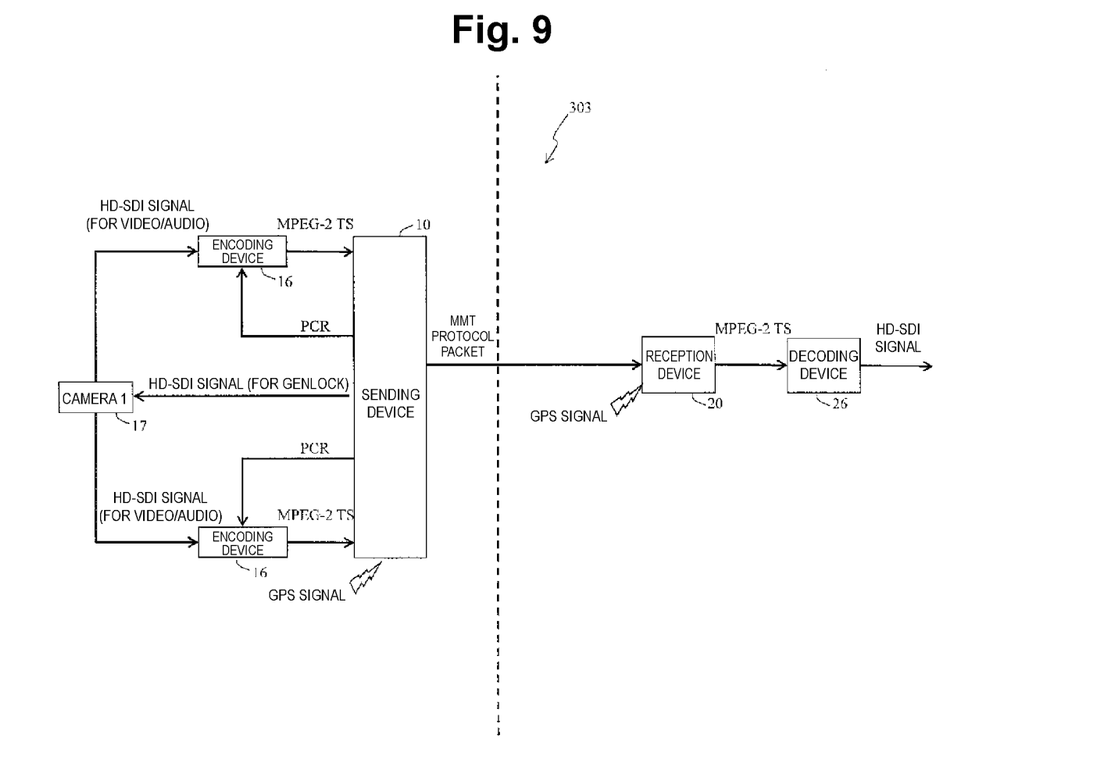
FIG. 9 illustrates a video audio transmission system according to the present invention.

FIG. 9 illustrates a video audio transmission system 303 of Embodiment 4. In the video audio transmission system 303, reliability is increased by including a plurality of the encoding devices 16. The sending device 10 of this embodiment has a configuration obtained by adding, to the sending device 10 of Embodiment 1, a plurality of buffers individually accumulating MPEG-2 TS from the plurality of encoding devices 16, a function of sending out a video/audio to an IP network by an MMT protocol packet by switching the buffers, and a function of sending a PCR derived from a UTC by a common third method to the plurality of encoding devices 16. In other words, the plurality of buffers holding the encoded streams received from the plurality of encoding devices 16 are included in the sending control unit 14, and the protocol packet is sent out from the encoded stream of a selected one of the buffers.

In this embodiment, the start control unit 13 calculates the PCR from the UTC with use of Formula 3 and sends the PCR to the encoding device 16 by including the PCR in a start signal. When each of the encoding devices 16 receives the PCR from the sending device 10, each of the encoding devices 16 initializes a PCR held by the encoding device 16 by the received PCR. In other words, the PCRs of MPEG-2 TS to be output from the plurality of encoding devices 16 that have received the PCRs from the sending device 10 are aligned.

Figure 10:
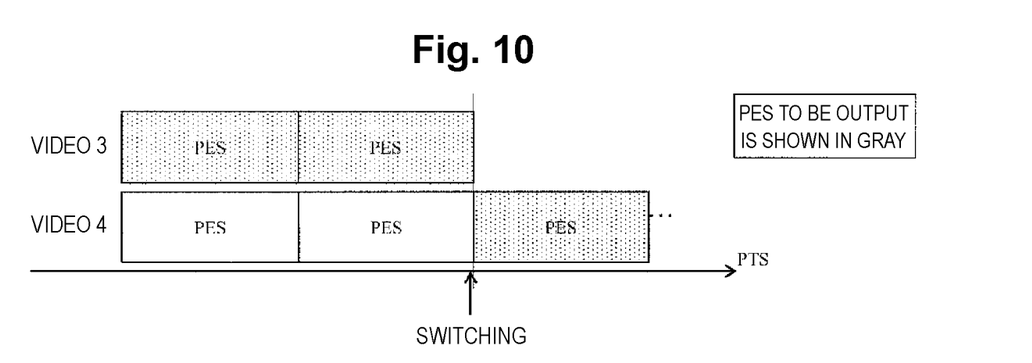
FIG. 10 illustrates the operation when videos are switched in the video audio transmission system according to the present invention.

FIG. 10 illustrates the operation of switching a video 3 to a video 4 performed by the sending device 10. At the buffers of the sending control unit 14, MPEG-2 TS from the plurality of encoding devices 16 is received, and a PES is extracted from each MPEG-2 TS and is accumulated. A common video signal is supplied to the plurality of encoding devices 16 and the PCRs are aligned, and hence the same frames are accumulated in the buffers as PESs having the same PTS. When the PES is sent out as an MMT protocol packet, the PES is drawn out from any one of the buffers. The video 3 and the video 4 are series of PESs extracted from MPEG-2 TS of two encoding devices. Even if one of the series is interrupted for some reason, the same PES can be acquired from the other buffer, and hence video loss can be avoided. Switching can be performed by accumulation in the MPU. However, as compared to the switching of the MPU formed by units of GOPs, switching in units of PESs can be controlled at shorter time intervals.

Effects of the Invention

By supplying the clock generated from the time point information in the sending device 10 to the camera as the genlock signal and further supplying the clock as a clock of the video signal output from the camera 17 to the encoding device 16, the proceeding speed of the PCR of the encoding device is synchronized with the common time point information. By supplying the clock generated from the time point information also in the reception device 20 to the decoding device as the genlock signal, the proceeding speed of the PCR of the decoding device is synchronized with the common time point information. Therefore, the clock deviation among the devices is eliminated, and accurate interconversion becomes possible between the PCR and the UTC. As a result, the buffer overflow and the buffer depletion in the decoding device can be avoided. The frame periods of the plurality of dispersed encoding devices 16 can be aligned, and reliable GOP synchronization can be realized.

When the reception device 20 includes a plurality of buffers and switches a plurality of videos, the switching can be performed without interruption.

When the sending device 10 includes a plurality of buffers and the videos of the plurality of encoding devices to which the same video signal is input are switched, video cut off due to a failure of one encoding device can be avoided.

REFERENCE SIGNS LIST

10 Sending device
11 Sending-side clock signal generation unit
12 Sending-side genlock signal generation unit
13 Start control unit
14 Sending control unit
16 Encoding device
17 Camera
20 Reception device
21 Reception-side clock signal generation unit
22 Reception-side genlock signal generation unit
23 Reception control unit
26 Decoding device
30 Display device
31 Combining device
32 Monitor
301, 302, 303 Video audio transmission system

The invention claimed is:

1. A video audio transmission system, comprising:
a plurality of sending devices that each encode a video audio signal from a subordinate camera by a subordinate one of encoding devices and send the video audio signal by a packet of a freely-selected transmission protocol; and
a plurality of reception devices that are each configured to decode the packet, which is sent from each of the plurality of sending devices, to the video audio signal by decoding the packet by a subordinate decoding device,
the video audio transmission system is configured to perform Group of Pictures (GOP) synchronization of the encoding devices,
wherein:
the plurality of sending devices each include a sending-side clock signal generation unit, a sending-side genlock signal generation unit, a start control unit, and a sending control unit, wherein:
the sending-side clock signal generation unit is configured to acquire absolute time and generate a clock for video synchronized with the absolute time;
the sending-side genlock signal generation unit configured to generate a frame border time point from the absolute time by a first method common between the plurality of sending devices and supply a genlock signal generated from the clock for video and the frame border time point to the subordinate camera;

the start control unit is configured to calculate a GOP border time point from the absolute time by a second method common between the plurality of sending devices and control a timing at which a start signal that is an instruction for starting encoding of the video audio signal from the subordinate camera is sent to the subordinate one of encoding devices by the GOP border time point; and the sending control unit is configured to replace a time stamp included in an encoded stream generated by the encoding devices with a time stamp in accordance with the absolute time and send the time stamp as the packet of the freely-selected transmission protocol; and the reception devices each include a reception-side clock signal generation unit, a reception-side genlock signal generation unit, and a reception control unit, wherein:

the reception-side clock signal generation unit is configured to acquire absolute time and generate a clock for video synchronized with the absolute time;

the reception-side genlock signal generation unit is configured to generate a frame border time point from the absolute time by a first method common between the reception devices, and supply a genlock signal generated from the clock for video and the frame border time point to the subordinate decoding device; and the reception control unit is configured to generate relative time from the absolute time by a third method common between the reception devices, extract the encoded stream from the packet of the freely-selected transmission protocol that is received, and replace the time stamp in accordance with the absolute time included in the encoded stream with a time stamp in accordance with the relative time.

2. The video audio transmission system according to claim 1, wherein:

the reception control unit includes a plurality of buffers that each hold the packet of the freely-selected transmission protocol received from each of the plurality of sending devices; and the encoded stream is extracted from the packet of the transmission protocol of a selected one of the plurality of buffers.

3. A transmission method of a video audio transmission system, the video audio transmission system comprising:

a plurality of sending devices that each encode a video audio signal from a subordinate camera by a subordinate one of encoding devices and send the video audio signal by a packet of a freely-selected transmission protocol;

a plurality of reception devices that each decode the packet, which is sent from each of the plurality of sending devices, to the video audio signal by decoding the packet by a subordinate decoding device; and a plurality of display devices that display the video audio signal decoded by each of the plurality of reception devices, the transmission method comprising:

performing, by each of the plurality of sending devices, a sending-side clock signal generation procedure, a sending-side genlock signal generation procedure, a start control procedure, and a sending control procedure;

acquiring absolute time and generating a clock for video synchronized with the absolute time in the sending-side clock signal generation procedure;

generating a frame border time point from the absolute time by a first method common between the plurality of sending devices and supplying a genlock signal generated from the clock for video and the frame border time point to the subordinate camera in the sending-side genlock signal generation procedure;

calculating a Group of Pictures (GOP) border time point from the absolute time by a second method common between the plurality of sending devices and controlling a timing at which a start signal that is an instruction for starting encoding of the video audio signal from the subordinate camera is sent to the subordinate one of encoding devices by the GOP border time point in the start control procedure;

replacing a time stamp included in an encoded stream generated by the encoding devices with a time stamp in accordance with the absolute time and sending the time stamp as the packet of the freely-selected transmission protocol in the sending control procedure;

performing, by each of the plurality of reception devices, a reception-side clock signal generation procedure, a reception-side genlock signal generation procedure, and a reception control procedure;

acquiring absolute time and generating a clock for video synchronized with the absolute time in the reception-side clock signal generation procedure;

generating a frame border time point from the absolute time by a first method common between the plurality of reception devices and supplying a genlock signal generated from the clock for video and the frame border time point to the subordinate decoding device in the reception-side genlock signal generation procedure;

generating relative time from the absolute time by a third method common between the plurality of reception devices, extracting the encoded stream from the received packet of the freely-selected transmission protocol, and replacing the time stamp in accordance with the absolute time included in the encoded stream with a time stamp in accordance with the relative time in the reception control procedure; and performing GOP synchronization of the encoding devices and performing synchronization of the relative time generated by the reception devices.

4. A sending device that encodes a video audio signal from a subordinate camera by a subordinate encoding device and sends the video audio by a packet of a freely-selected transmission protocol, the sending device comprising a sending-side clock signal generation unit, a sending-side genlock signal generation unit, and a sending control unit, wherein:

the sending-side clock signal generation unit is configured to acquire absolute time and generate a clock for video synchronized with the absolute time;

the sending-side genlock signal generation unit is configured to supply a genlock signal generated from the clock for video to the subordinate camera;

the sending control unit is configured to replace a time stamp included in an encoded stream generated by the subordinate encoding device with a time stamp in accordance with the absolute time and send the time stamp as the packet of the freely-selected transmission protocol; and conversion of time stamps of which proceeding speeds are synchronized is performed between the time stamp included in the encoded stream and the time stamp in accordance with the absolute time;

wherein:

the sending-side genlock signal generation unit calculates a frame border time point from the absolute time by a first method common between a plurality of the sending devices and controls the genlock signal by the frame border time point;

the sending device further comprises a start control unit that calculates a Group of Pictures (GOP) border time point from the absolute time by a second method common between the plurality of sending devices and controls a timing at which a start signal that is an instruction for starting encoding of the video audio signal from the subordinate camera is sent to the subordinate encoding device by the GOP border time point; and GOP synchronization of the subordinate encoding device and an encoding device subordinate to another one of the sending devices is performed.

5. The sending device according to claim 4, wherein relative time derived from the absolute time by a third method common between the plurality of the sending devices is sent.

6. A reception device that decodes a packet of a freely-selected transmission protocol, which is obtained by encoding a video audio signal from a camera by an encoding device and replacing a time stamp included in an encoded stream generated by the encoding device with a time stamp in accordance with absolute time and which is sent by a sending device, to the video audio signal by decoding the packet by a subordinate decoding device, the reception device comprising a reception-side clock signal generation unit, a reception-side genlock signal generation unit, and a reception control unit, wherein:

the reception-side clock signal generation unit acquires absolute time and generates a clock for video synchronized with the absolute time;

the reception-side genlock signal generation unit generates a frame border time point from the absolute time by a first method common between a plurality of the reception devices, and supplies a genlock signal generated from the clock for video and the frame border time point to the subordinate decoding device;

the reception control unit generates relative time from the absolute time by a third method common between reception devices, extracts the encoded stream from the received packet of the freely-selected transmission protocol, and replaces the time stamp in accordance with the absolute time included in the encoded stream with a time stamp in accordance with the relative time; and the relative time is synchronized with relative time generated by another one of the reception devices.

7. The reception device according to claim 6, wherein:

the reception control unit includes a plurality of buffers that each hold the packet of the freely-selected transmission protocol, which is received from each of a plurality of the sending devices and of which GOP synchronization is performed by the subordinate decoding device; and the encoded stream is extracted from the packet of the transmission protocol of a selected one of the plurality of buffers.

* * * * *